E. E. McCOLLUM.
SHOCK ABSORBER.
APPLICATION FILED JUNE 16, 1919.
1,341,274. Patented May 25, 1920.
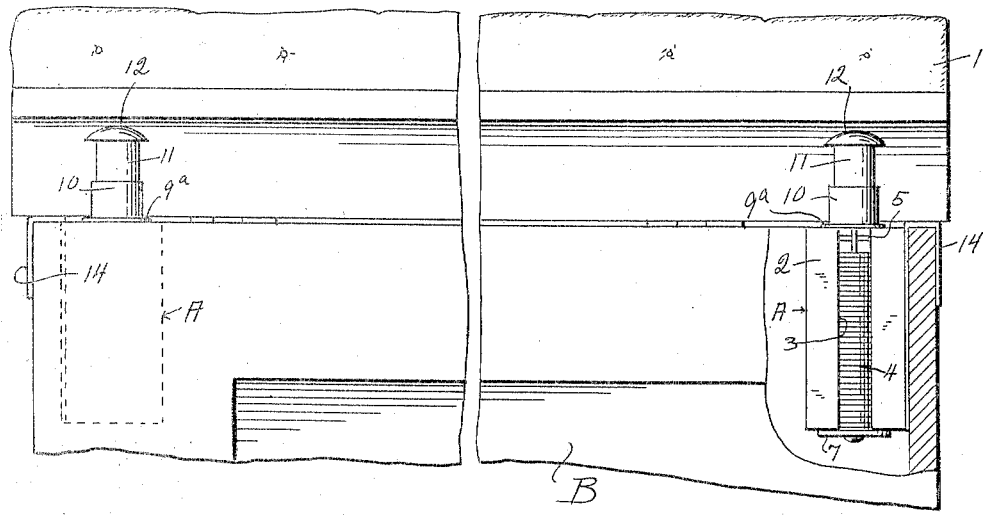
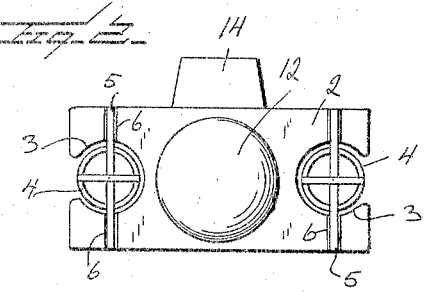
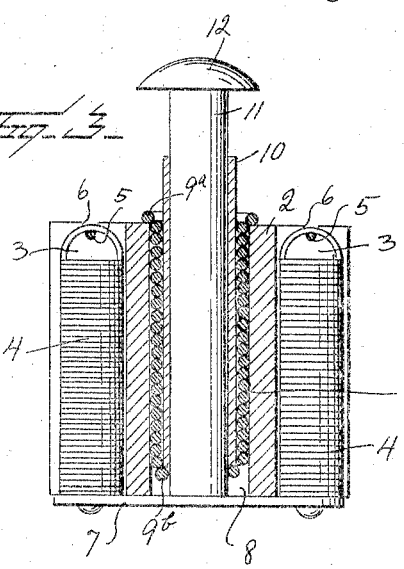
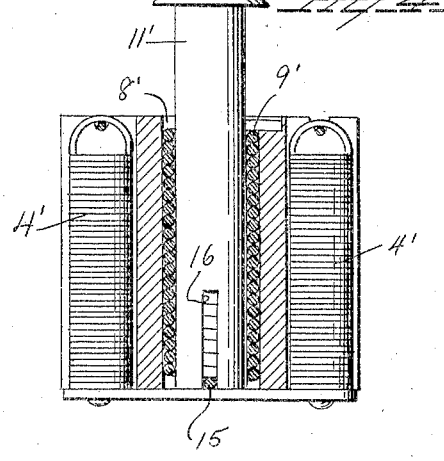
Inventor
E. E. McCollum
By Watson E. Coleman
Attorney

UNITED STATES PATENT OFFICE.

ERNEST E. McCOLLUM, OF MATTOON, ILLINOIS.

SHOCK-ABSORBER.

1,341,274.   Specification of Letters Patent.   Patented May 25, 1920.

Application filed June 16, 1919. Serial No. 304,440.

*To all whom it may concern:*

Be it known that I, ERNEST E. McCOLLUM, a citizen of the United States, residing at Mattoon, in the county of Coles and State of Illinois, have invented certain new and useful Improvements in Shock-Absorbers, of which the following is a specification, reference being had to the accompanying drawings.

This invention relates to certain improvements in shock absorbers and has relation more particularly to a device of this general character especially designed and adapted for use in connection with seat boxes such as are generally used by enginemen, and it is an object of the invention to provide a novel and improved device of this general character which may be readily applied or removed so that the same may be conveniently carried by the individual user.

Another object of the invention is to provide a novel and improved device of this general character which, when in applied position, serves to relieve the occupant of the seat of jar and vibration incident to the travel of the engine.

The invention consists in the details of construction and in the combination and arrangement of the several parts of my improved shock absorber whereby certain important advantages are attained and the device rendered simpler, less expensive and otherwise more convenient and advantageous for use, is will be hereinafter more fully set forth.

The novel features of my invention will hereinafter be definitely claimed.

In order that my invention may be the better understood, I will now proceed to describe the same with reference to the accompanying drawings, wherein:

Figure 1 is a view, partly in elevation and partly in section illustrating a box seat having applied thereto shock absorbers constructed in accordance with an embodiment of my invention.

Fig. 2 is a view in top plan of a shock absorber constructed in accordance with my present invention;

Fig. 3 is a view, partly in section and partly in elevation, of the device as illustrated in Fig. 2, and Fig. 4 is a view similar to Fig. 3 illustrating a shock absorber constructed in accordance with a further embodiment of my invention.

As disclosed in the accompanying drawings, B denotes a seat box of a type generally employed in an engine cab and which includes the hinged cover 1 which serves as the seat.

Coacting with the opposite end portions of the cover 1 and detachably engaged with the upper marginal portions of the ends of the box B proper are the shock absorbers A constructed in accordance with my present invention. As these absorbers A are of similar construction and operate in the same manner, a detail description of one is believed to be sufficient for the purposes of disclosure.

Each of the absorbers A comprises a body 2 preferably rectangular in form and which has its side edges or faces provided therealong with the grooves or channels 3. Arranged within each of the grooves or channels 3 is a retractile member 4, herein disclosed as a coil spring.

The upper end portion of the member 4 is secured to a bar or pin 5 bridging the upper end of the groove or channel 3 and having its end portions seated in the notches 6 in the upper face of the body 2, whereby said bar or pin 5 is maintained in desired position. The opposite end portion of the member 4 is anchored to an elongated plate or cross member 7 underlying the body 2 and normally in contact therewith.

At a point substantially midway between the grooves or channels 3, the body 2 has disposed therethrough an opening 8 substantially in parallelism with the grooves or channels 3 and arranged within said opening 8 is a retractile member 9, also constituting a coil spring. The upper end portion of the member or spring 9 is provided with an outstanding flange $9^a$ afforded by a coil of the spring or member 9 and which flange or coil $9^a$ rests upon the upper face of the block 2. The lower end portion of the member or spring 9 is defined by an inwardly directed flange or coil $9^b$.

Disposed through the member or spring 9 is a tubular member 10, the lower end of which rests upon the inwardly directed flange or coil $9^b$. The member 10 is of a length to normally extend above the upper face of the block 2.

11 denotes a plunger extending through the tubular member 10 from above and the lower end of said plunger directly contacts with the plate or cross member 7. Head 12 of the plunger engages the lower surface of the cover 1 and normally maitnains said cover in a raised position.

Suitably secured to a side face of the body 2 is a downwardly facing hook member 14 which is adapted to straddle the upper marginal portion of a side wall of the box B proper for maintaining the device in applied position.

It is also preferred that each of the grooves or channels 3 be rounded in cross section and in excess of a semi-circle so that the expansible member or spring 4, snugly fitting therein but capable of ready expansion or retraction is held against buckling.

In practice when the seat is occupied the members or springs 4 support the load under normal conditions but in the event of an unusually heavy shock or jar resulting in a pronounced downward travel of the plungers 11, the heads 12 of the plungers 11 contact with the upper ends of the members 10 so that the springs 9 are brought into action in order that the cover 1 is prevented from coming into abrupt contact with the box B proper.

In the embodiment of my invention as illustrated in Fig. 4, the plunger 11' extends through the opening 8' and also through the retractile member 9'. The member 9' constitutes a coil spring and is secured at one end portion to the upper portion of the opening 8'. The opposite or lower end portion of the member or spring 9' is bridged by a rod or a pin 15. The lower end portion of the plunger 11' is bifurcated by the kerf 16 in which the rod or pin 15 is received. The remaining parts of the device are constructed and arranged in substantially the same manner as has hereinbefore been set forth with respect to Figs. 1 to 3.

The kerf 16 in the lower end portion of the plunger 11' permits the plunger, under normal conditions, to have endwise movement under control of the members or springs 4' independently of the member or spring 9'. In the event of an unusually heavy shock or jar the spring or member 9' is brought into action by contact of the inner or closed end of the kerf 16 with the pin or rod 15.

From the foregoing description, it is thought to be obvious that a shock absorber constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising a body provided with support engaging means and having an opening therethrough, the side walls of said body being provided with channels, retractile members positioned within said channels and supported by the body, a plate underlying the body and engaged with said retractile members, and a plunger extending within the opening of the body and engaging the plate.

2. A device of the class described comprising a body provided with support engaging means and having an opening therethrough, a yieldably supported member carried by the body and extending across an end of the opening, a plunger extending through the opening and contacting with the member, and a normally inactive shock absorbing agency coacting with the plunger independently of the member.

3. A device of the class described comprising a body provided with support engaging means and having an opening therethrough, a yieldably supported member carried by the body and extending across an end of the opening, a plunger extending through the opening and engaging the member, and a normally inactive cushioning agency arranged within the opening and coacting with the plunger independently of the member.

4. A device of the class described comprising a body provided with support engaging means and having an opening therethrough, a yieldably supported member carried by the body and extending across an end of the opening, a tubular retractile member extending within the opening of the body and supported thereby, the inner end of the retractile member being provided with an inwardly directed flange, a tubular member extending within the bore of the retractile member and contacting with the flange thereof, and a plunger extending through said tubular member and contacting at one end with the yieldably supported member, the opposite end portion of the plunger being provided with a head for contact with the adjacent end of the tubular member.

In testimony whereof I hereunto affix my signature in the presence of two witnesses.

ERNEST E. McCOLLUM.

Witnesses:
BART EVANS,
OSCAR BEARD.